US012602854B2

(12) United States Patent
Sezganov et al.

(10) Patent No.: US 12,602,854 B2
(45) Date of Patent: Apr. 14, 2026

(54) SYSTEM AND METHOD FOR MEDICAL IMAGING

(71) Applicant: BODY VISION MEDICAL LTD., Ramat Hasharon (IL)

(72) Inventors: Dima Sezganov, Ramat Hasharon (IL); Dorian Averbuch, Campbell, CA (US)

(73) Assignee: BODY VISION MEDICAL LTD., Ramat Hasharon (IL)

( * ) Notice: Subject to any disclaimer, the term of this patent is extended or adjusted under 35 U.S.C. 154(b) by 0 days.

(21) Appl. No.: 18/504,311

(22) Filed: Nov. 8, 2023

(65) Prior Publication Data

US 2024/0185487 A1      Jun. 6, 2024

Related U.S. Application Data

(63) Continuation of application No. 18/062,464, filed on Dec. 6, 2022, now Pat. No. 11,816,768.

(51) Int. Cl.
*G06K 9/00*      (2022.01)
*G06T 5/70*      (2024.01)
(Continued)

(52) U.S. Cl.
CPC .............. *G06T 11/008* (2013.01); *G06T 5/70* (2024.01); *G06T 7/73* (2017.01); *G06T 11/006* (2013.01);
(Continued)

(58) Field of Classification Search
CPC ......... G06T 7/73; G06T 5/002; G06T 11/006; G06T 2207/10064; G06T 2207/10081;
(Continued)

(56) References Cited

U.S. PATENT DOCUMENTS 11,282,221 B1 *    3/2022  Yang ...................... G16H 50/20
2016/0242710 A1 *  8/2016  Grbic ...................... A61B 6/12
(Continued)

FOREIGN PATENT DOCUMENTS

WO      2015075558      5/2015
WO      2015101948      7/2015
(Continued)

OTHER PUBLICATIONS

Gue et al., "Multi-Scale Wavelet Domain Residual Learning for Limited-Angle CT Reconstruction," 5 pages (2017).
(Continued)

*Primary Examiner* — Atiba O Fitzpatrick
(74) *Attorney, Agent, or Firm* — Greenberg Traurig, LLP

(57) ABSTRACT

A method including receiving, from a C-arm device, a plurality of fluoroscopic images of a lung, wherein each fluoroscopic image is obtained with the C-arm device positioned at a particular pose of a plurality of poses traversed by the C-arm device while the C-arm device is moved through a range of motion including a range of rotation, the range of rotation encompassing a sweep angle between 45 degrees and 120 degrees; generating an enhanced tomographic image of the lung, by utilizing: a trained machine learning model and the plurality of fluoroscopic images; and outputting a representation of the enhanced tomographic image, wherein, when tested by a method in which: the lung includes a lesion smaller than 30 millimeters, and the representation is an axial slice showing a boundary of the lesion, the lesion has a contrast-to-noise value of at least 5 as compared to a background of the representation.

11 Claims, 18 Drawing Sheets

(51) Int. Cl.

| | | |
|---|---|---|
| *G06T 7/73* | (2017.01) | |
| *G06T 11/00* | (2006.01) | |

(52) U.S. Cl.

CPC .............. *G06T 2207/10064* (2013.01); *G06T 2207/10081* (2013.01); *G06T 2207/20081* (2013.01); *G06T 2207/30061* (2013.01); *G06T 2207/30096* (2013.01); *G06T 2207/30204* (2013.01); *G06T 2210/41* (2013.01); *G06T 2211/421* (2013.01)

(58) Field of Classification Search

CPC . G06T 2207/20081; G06T 2207/30061; G06T 2207/30096; G06T 2207/30204; G06T 2210/41; G06T 2211/421; G06T 11/003–008; G06T 2211/416; G06T 2207/10121; G06T 2211/40; G06T 2211/424; G06T 2211/428; G06T 2211/432; G06T 2211/436; G06T 2211/441; G06T 2211/444; G06T 2207/30064; G06T 2207/20084; G06T 9/002; G06T 5/60; G06T 5/00–94; A61B 5/0073; A61B 6/032; A61B 6/035; G06K 9/6256; G06K 9/6257; G06K 9/6259; G06V 10/70; G06V 10/82; G06V 10/774–7796; G06V 10/454; G06N 3/02–126; G06N 20/00–20; G06F 18/214–2155; G06F 7/023; G06F 40/16; G01N 29/4481

See application file for complete search history.

(56) References Cited

U.S. PATENT DOCUMENTS

| | | | | |
|---|---|---|---|---|
| 2020/0222018 | A1* | 7/2020 | van Walsum | ........ A61B 6/5264 |
| 2020/0279411 | A1* | 9/2020 | Atria | ..................... G06T 11/006 |
| 2020/0297292 | A1* | 9/2020 | Alexandroni | ........ A61B 6/5294 |
| 2020/0410666 | A1* | 12/2020 | Wagner | .................. A61B 6/486 |
| 2021/0052240 | A1* | 2/2021 | Weingarten | ............ A61B 6/487 |
| 2021/0186442 | A1* | 6/2021 | Parthasarathy | ........ A61B 6/027 |

| | | | | |
|---|---|---|---|---|
| 2021/0361254 | A1* | 11/2021 | Rohler | .................... A61B 6/586 |
| 2022/0092791 | A1* | 3/2022 | Dougherty | ............ G06T 7/0012 |
| 2022/0323029 | A1* | 10/2022 | Hartley | .................. A61B 6/584 |
| 2022/0327698 | A1* | 10/2022 | Okumura | .............. G06T 7/0012 |
| 2023/0011644 | A1* | 1/2023 | Zhao | ..................... A61B 6/5282 |
| 2023/0038871 | A1* | 2/2023 | Van Veen | ............. A61B 6/4441 |
| 2023/0121890 | A1* | 4/2023 | Gong | ......................... G06T 5/70 348/607 |
| 2023/0215059 | A1* | 7/2023 | Ayvali | ................... G06V 40/10 |
| 2024/0138818 | A1* | 5/2024 | Schwab | ................. A61B 90/36 |
| 2024/0197928 | A1* | 6/2024 | Scafoglio | .............. A61K 31/70 |

FOREIGN PATENT DOCUMENTS

| | | |
|---|---|---|
| WO | 2016067092 | 5/2016 |
| WO | 2017153839 | 9/2017 |
| WO | 2018065824 | 4/2018 |
| WO | 2018078445 | 5/2018 |
| WO | 2018215832 | 11/2018 |
| WO | 2020035730 | 2/2020 |
| WO | 2020174284 | 9/2020 |
| WO | 2021033025 | 2/2021 |
| WO | 2021148881 | 9/2021 |

OTHER PUBLICATIONS

Kimpe et al., "Increasing the Number of Gray Shades in Medical Display Systems-How Much is Enough?," Journal of Digital Imaging, vol. 20, No. 4, pp. 422-432 (2007).

Ritschl et al., "The rotate-plus-shift C-arm trajectory: Complete CT data with less than 180 rotation," 12 pages (2014).

Shi et al., "A Novel Iterative CT Reconstruction Approach Based on FBP Algorithm," Journal Pone, pp. 1-17 (2015).

Wang et al., "Limited-Angle Computed Tomography Reconstruction using Combined FDK-Based Neural Network and U-Net," 4 pages (2020).

Yan et al., "A method to assess image quality for Low-dose PET: analysis of SNR, CNR, bias and image noise," Cancer Imaging, 12 pages, 16:26 (2016).

International Search Report and Written Opinion to corresponding International Application No. PCT/IB2023/000777, mailed Mar. 19, 2024 (8 pages).

* cited by examiner

Method 200

Start

210 — Receive fluoroscopic images

220 — Reconstruct simulated tomographic image based on fluoroscopic images

230 — Apply trained tomographic image enhancement machine learning model to generate enhanced simulated tomographic image 240 — Output representation of enhanced simulated tomographic image End Coronal Axial Sagittal Coronal Axial Sagittal Coronal Axial Sagittal

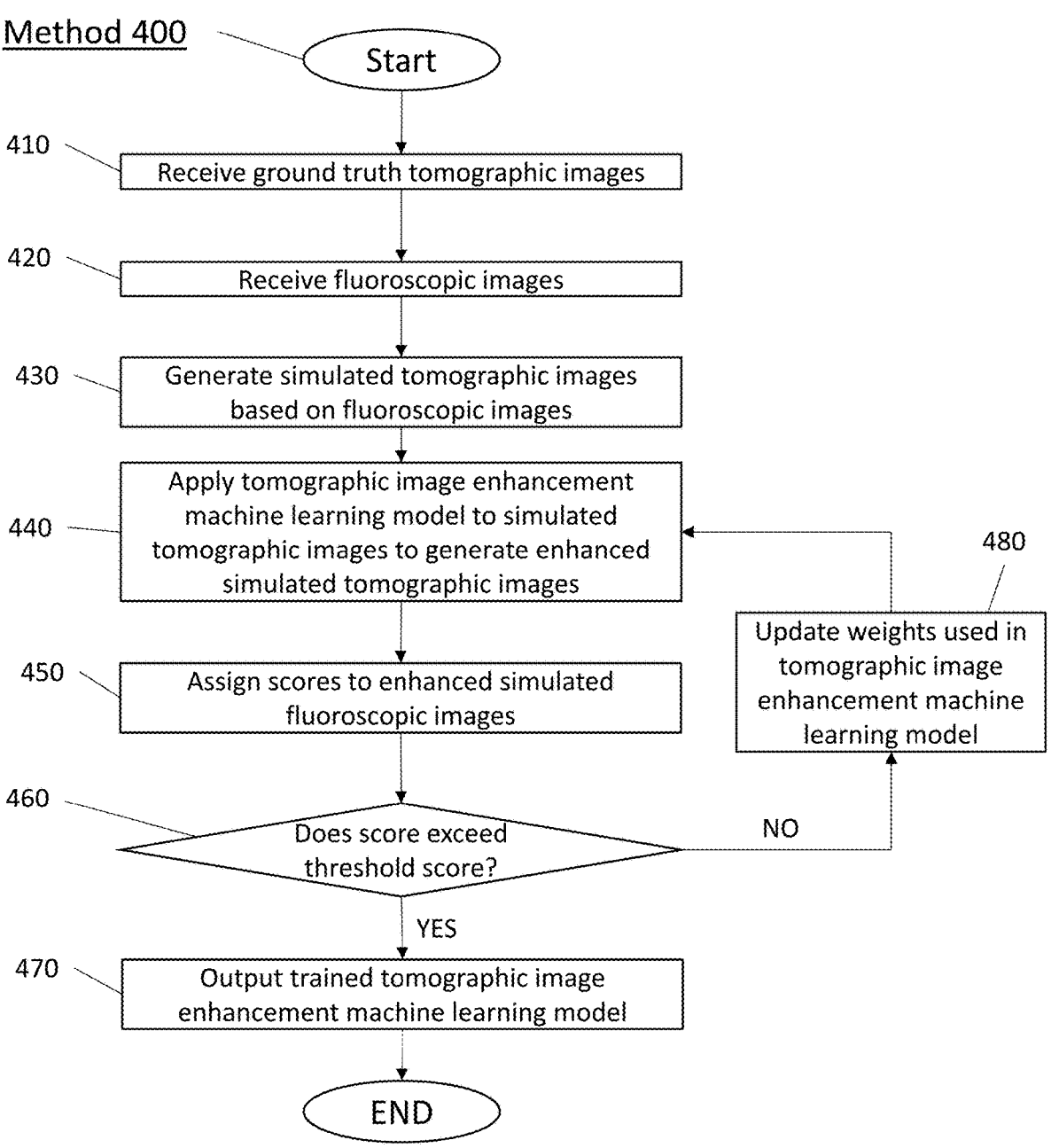

Method 400

Start

410 — Receive ground truth tomographic images

420 — Receive fluoroscopic images

430 — Generate simulated tomographic images based on fluoroscopic images

440 — Apply tomographic image enhancement machine learning model to simulated tomographic images to generate enhanced simulated tomographic images 480 — Update weights used in tomographic image enhancement machine learning model 450 — Assign scores to enhanced simulated fluoroscopic images 460 — Does score exceed threshold score?

NO

YES

470 — Output trained tomographic image enhancement machine learning model

END

Figure 4

Coronal
Axial
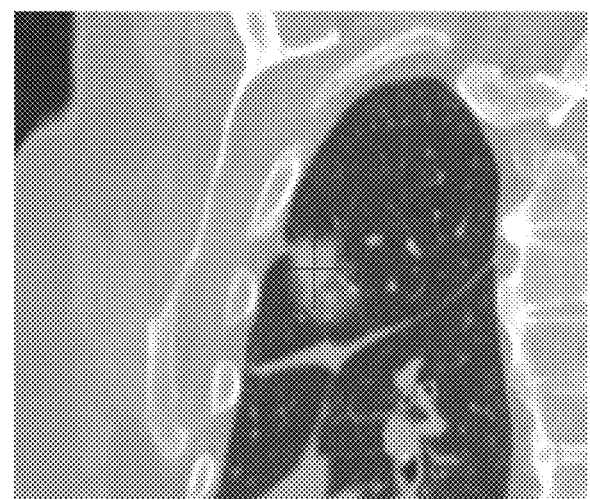
Sagittal
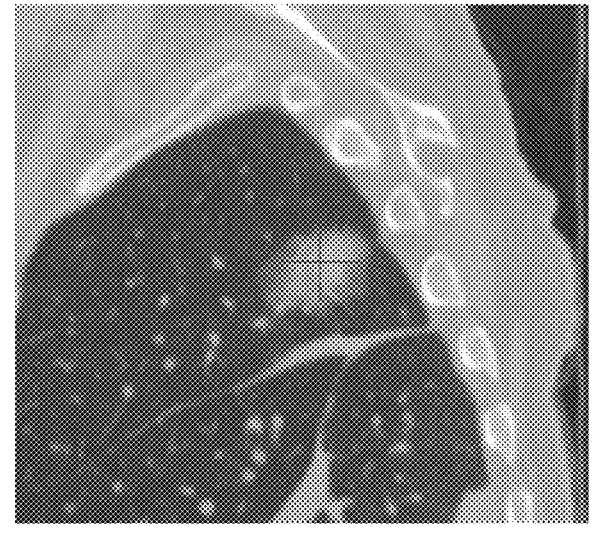
Figure 5A

Coronal
Axial
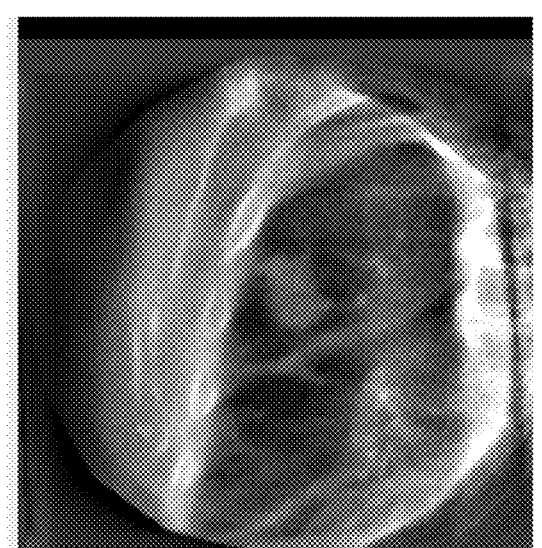
Sagittal
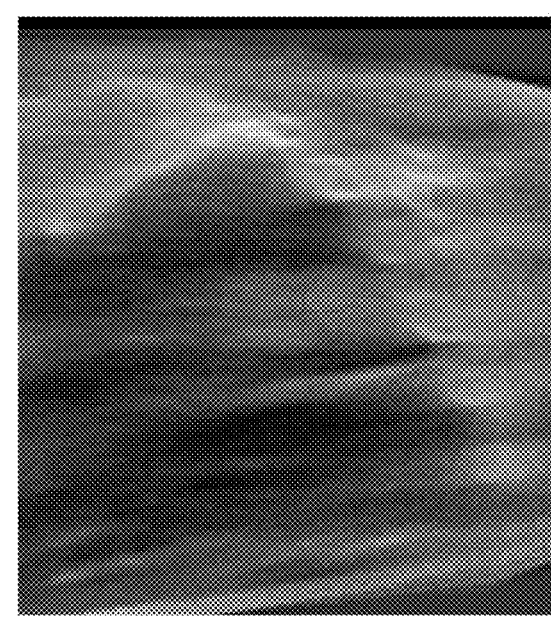
Figure 5C

Coronal
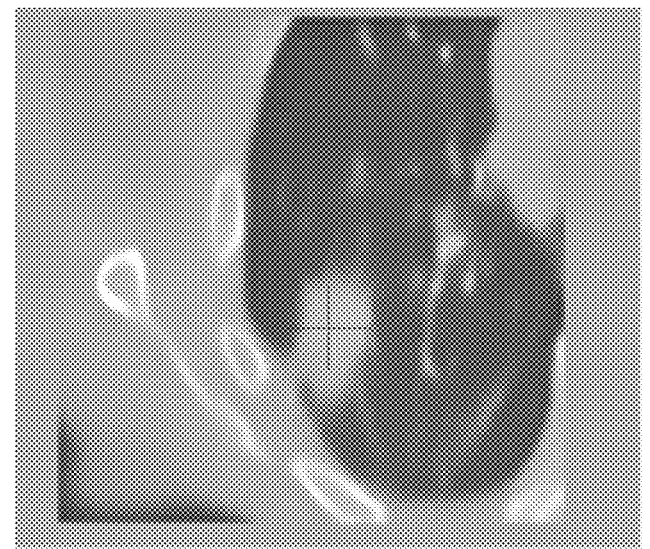
Axial
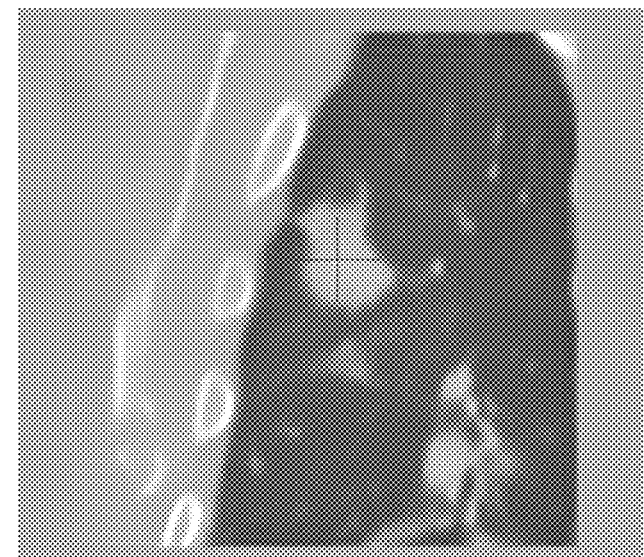
Sagittal
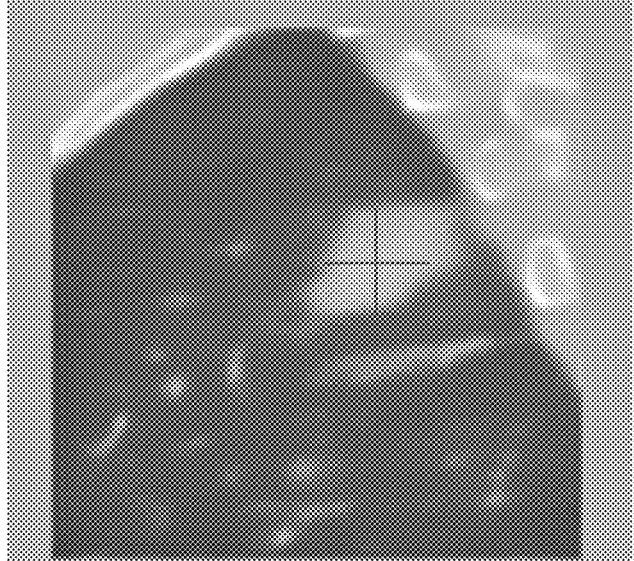
Figure 5D

SYSTEM AND METHOD FOR MEDICAL IMAGING

CROSS-REFERENCE TO RELATED APPLICATION

This application is a continuation of U.S. application Ser. No. 18/062,464, filed Dec. 6, 2022, entitled "System and Method for Medical Imaging," the entire contents of which is hereby incorporated by reference in its entirety.

FIELD OF THE INVENTION

The present disclosure is related to systems and methods for medical imaging. More particularly, the present disclosure is related to systems and methods for obtaining a CT-like medical image using a C-arm based fluoroscopic imaging device.

BACKGROUND OF THE INVENTION

Computed tomography ("CT") scanning is a type of medical imaging that uses a rotating X-ray tube to obtain detailed internal images. CT scanning serves as the "gold standard" for diagnosing a number of conditions, including cancers such as lung lesions. However, CT scanning devices are expensive, require a licensed radiologist to operate them, and the number of scans that can be performed in a given time period is limited even in facilities where such devices are available. Additionally, CT scans involve the delivery of a large radiation dose to patents, and as such are only performed when the diagnostic benefits outweigh the radiation-related cancer risks to the patient.

C-arm-mounted fluoroscopic imaging devices, such as X-ray imaging devices, are widely used for diagnostic and treatment procedures, are easily accessible by the variety of specialties operating within a typical hospital, and are associated with a low radiation dose. In some cases, C-arm-mounted imaging devices are used to obtain a sequence of two-dimensional images while the C-arm is moved through a range of rotation. Such sequences of images can be used to "reconstruct" a three-dimensional volume or tomographic image. However, the image quality of such reconstructed volumes is not homogeneous and may not be sufficient for some types of clinical applications, such as diagnosis of early-stage lung cancers presenting with small (e.g., less than 10 millimeters) lesions or low-density lesions (e.g., having a density of less than −300 Hounsfield units) such as the type known in medical literature as semi-solid or ground-glass opacity lesions.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 4 shows an exemplary process for training a machine learning model for enhancing a tomographic image.

FIG. 5A shows an exemplary ground truth tomographic image.

FIG. 5C shows an exemplary simulated tomographic image reconstructed using the simulated fluoroscopic images shown in FIG. 5B.

FIG. 5D shows an exemplary enhanced simulated tomographic image generated using a trained tomographic image enhancement machine learning model.

FIG. 10A shows a representative image having a sufficient contrast-to-noise ratio to discern a lesion.

FIG. 10B shows a representative image having an insufficient contrast-to-noise ratio to discern a lesion.

FIG. 10C shows a representative image having an insufficient contrast-to-noise ratio to discern a lesion.

SUMMARY OF THE DISCLOSURE

Figure 1:
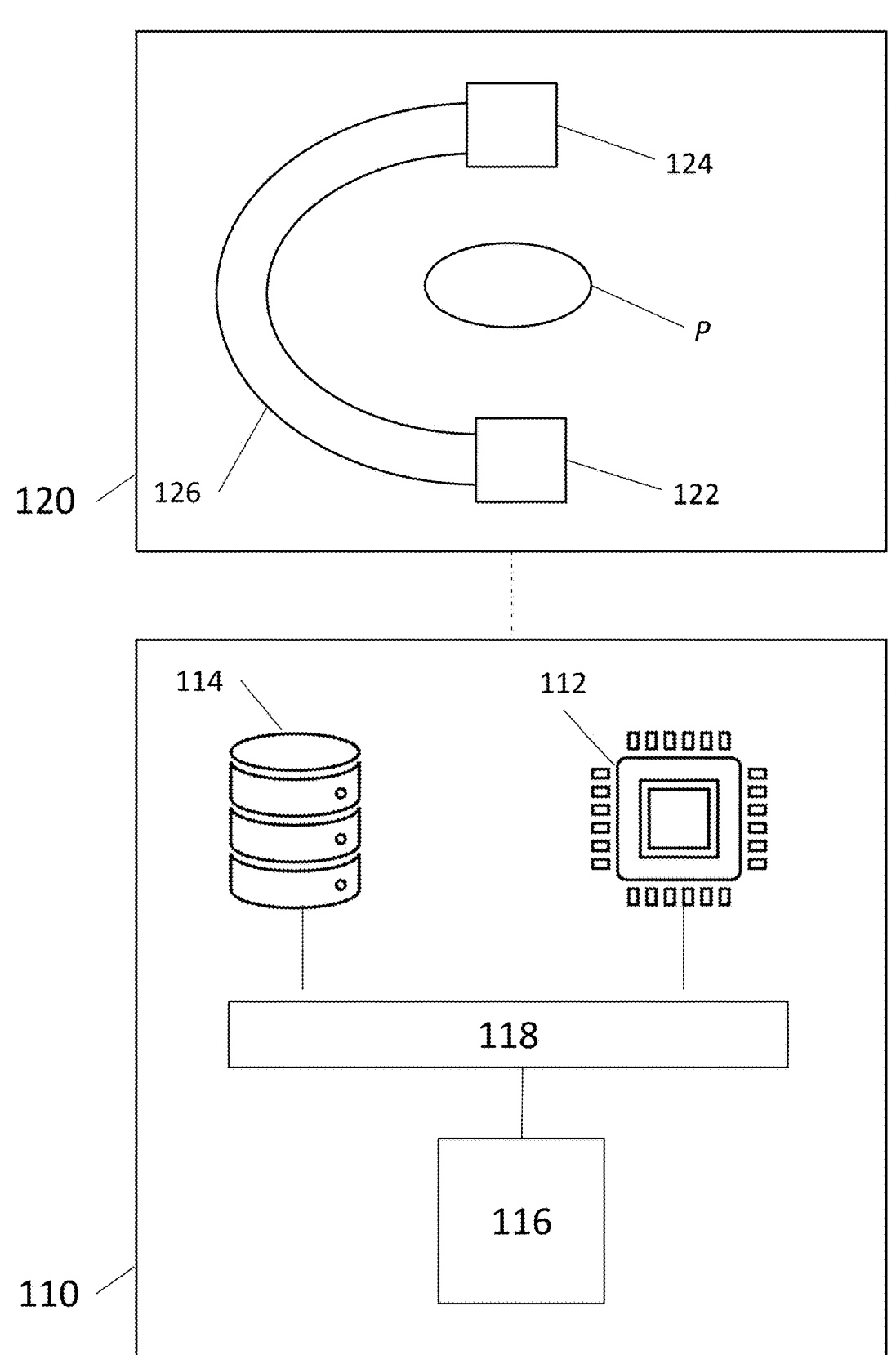
FIG. 1 shows an exemplary medical imaging system.

In some embodiments, a method includes a) receiving, by a controller unit, from a C-arm device, a plurality of fluoroscopic images of at least one portion of a lung of a patient, wherein each image of the plurality of fluoroscopic images is obtained with the C-arm device positioned at a particular pose of a plurality of poses traversed by the C-arm device while the C-arm device is moved through a range of motion, wherein the range of motion comprises at least a range of rotation, and wherein the range of rotation encompasses a sweep angle that is between 45 degrees and 120 degrees; b) generating, by the controller unit, an enhanced tomographic image of the at least a portion of the lung, by utilizing at least: a trained machine learning model and the plurality of fluoroscopic images; and c) outputting, by the controller unit, a representation of the enhanced tomographic image, wherein, when tested by a test method in which: (a) the at least one portion of the lung of the patient includes at least one lesion having a size of less than 30 millimeters, and (b) the representation of the enhanced tomographic image is an axial slice showing a defined boundary of the at least one lesion, the at least one lesion has a contrast-to-noise value of at least 5 as compared to a background of the representation.

In some embodiments, the step of generating the enhanced tomographic image includes reconstructing a tomographic image based on the plurality of fluoroscopic images; and enhancing the tomographic image using the trained machine learning model to generate the enhanced tomographic image. In some embodiments, the step of reconstructing the tomographic image based on the plurality of fluoroscopic images includes reconstructing the tomographic image using filtered back projection. In some embodiments, the step of reconstructing the tomographic image based on the plurality of fluoroscopic images includes determining a pose of each of the plurality of fluoroscopic images. In some embodiments, the determining the pose of each of the plurality of fluoroscopic images includes image-based pose estimation. In some embodiments, the image-based pose estimation comprises recognition of at least one of an anatomical feature or a radiopaque marker.

In some embodiments, the representation of the enhanced tomographic image comprises an axial slice.

In some embodiments, the sweep angle is between 45 degrees and 90 degrees.

In some embodiments, when tested by a test method in which: (a) the at least one portion of the lung of the patient includes at least one lesion having a size of less than 10 millimeters, and (b) the representation of the enhanced tomographic image is an axial slice showing a defined boundary of the at least one lesion, the at least one lesion has a contrast-to-noise value of at least 5 as compared to a background of the representation In some embodiments, the trained machine learning model comprises a gradient descent machine learning model.

In some embodiments, the range of motion further comprises a range of translational motion.

In some embodiments, a method includes obtaining, by a controller unit, a plurality of fluoroscopic images of a region of interest of tissue of a patient, wherein each image of the plurality of fluoroscopic images is obtained by a C-arm device with the C-arm device positioned at a particular pose of a plurality of poses traversed by the C-arm device while the C-arm device is moved through a range of rotation, and wherein the range of rotation encompasses less than 180 degrees of rotation; reconstructing, by the controller unit, using the plurality of fluoroscopic images, a tomographic image including the region of interest; and enhancing, by the controller unit, the tomographic image using a trained tomographic image enhancement machine learning model to generate an enhanced tomographic image, wherein the trained tomographic image enhancement machine learning model has been trained by a training process including: receiving CT image data for a plurality of patients, wherein the CT image data comprises a ground truth tomographic image for each of the plurality of patients; receiving a plurality of fluoroscopic images for each of the plurality of patients, generating, based on the CT image data for each of the plurality of patients, a plurality of simulated fluoroscopic images, wherein each fluoroscopic image of the plurality of simulated fluoroscopic images corresponds to a particular pose of a C-arm device at a particular angle, and wherein the plurality of fluoroscopic images corresponds to a plurality of angles that spans a range of rotation that is between 45 degrees and 120 degrees; reconstructing, based on the plurality of fluoroscopic images for each of the plurality of patients, a simulated tomographic image for each of the plurality of patients, wherein the simulated tomographic image comprises a plurality of artifacts; utilizing a tomographic image enhancement machine learning model to perform an enhancement process to enhance the simulated tomographic image for each of the plurality of patients to reduce the plurality of artifacts, to obtain an enhanced simulated tomographic image for each of the plurality of patients; scoring each enhanced simulated tomographic image based on the plurality of artifacts and a corresponding ground truth tomographic image to obtain a corresponding performance score for the tomographic image enhancement machine learning model; updating parameters of the tomographic image machine learning model while the performance score for the tomographic image enhancement machine learning model is less than a predetermined performance score threshold; and iteratively repeating the enhancement process until the corresponding performance score is equal to or above the predetermined performance score threshold to result in the trained tomographic image enhancement machine learning model.

In some embodiments, the plurality of fluoroscopic images for each of the plurality of patients includes a plurality of actual fluoroscopic images for at least some of the plurality of patients.

In some embodiments, the plurality of fluoroscopic images for each of the plurality of patients includes a plurality of simulated fluoroscopic images for at least some of the plurality of patients. In some embodiments, the plurality of simulated fluoroscopic images are generated by projecting at least one tomographic image into a plurality of poses.

In some embodiments, the step of reconstructing the tomographic image comprises reconstructing the tomographic image using filtered back projection.

In some embodiments, the range of rotation comprises between 45 degrees and 120 degrees of rotation.

DETAILED DESCRIPTION OF THE DRAWINGS

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

The exemplary embodiments relate to techniques for generating a CT-like image. More particularly, the exemplary embodiments relate to techniques for generating a CT-like image using a standard C-arm-mounted fluoroscopic imaging device through the use of reconstruction techniques and machine learning enhancement techniques as will be described hereinafter.

FIG. 1 illustrates an example of an implementation of a medical imaging system 100 in accordance with one or more exemplary embodiments of the present disclosure. In some embodiments, the medical imaging system 100 includes a computing device 110 for generating CT-like images in accordance with one or more embodiments of the present disclosure. In some embodiments, the computing device 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

Similarly, the computing device 110 may include storage 114, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 114 may include, e.g., a suitable non-transient computer readable medium such as, e.g., random access memory (RAM), read only memory (ROM), one or more buffers and/or caches, among other memory devices or any combination thereof.

In some embodiments, the computing device 110 may implement computer engines for generating a CT-like image based on fluoroscopic images obtained through the use of a C-arm-based imaging device in accordance with the exemplary embodiments described herein. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements that may be included in the computing device 110 may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, graphical processing units (GPU), and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software that may be executed by the computing device 110 may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to generate a CT-like image in accordance with the exemplary embodiments described herein, the computing device 110 may include computer engines including, e.g., a CT-like image generation engine 116. In some embodiments, CT-like image generation engine 116 may include dedicated and/or shared software components, hardware components, or a combination thereof. For example, the CT-like image generation engine 116 may include a dedicated processor and storage. However, in some embodiments, the CT-like image generation engine 116 may share hardware resources, including the processor 112 and storage 114 of the computing device 110 via, e.g., a bus 118. Thus, the CT-like image generation engine 116 may include a memory including software and software instructions, such as, e.g. machine learning models and/or logic for generating a CT-like image using fluoroscopic images obtained from a C-arm-mounted imaging device.

In some embodiments, the medical imaging system 100 includes a C-arm device 120. In some embodiments, the C-arm device 120 includes a radiation source 122 and an imaging device 124 (e.g., a fluoroscopic imaging device such as an X-ray imaging device) that is mounted to a C-arm 126 so as to allow the radiation source 122 and the imaging device 124 to be moved through a range of rotation with respect to a patient P, thereby to obtain a sequence of two-dimensional images of the patient P from a variety of perspectives (e.g., poses). In some embodiments, the C-arm device 120 is a fixed device (e.g., is in a fixed location with respect to a room and/or with respect to a bed). In some embodiments, the C-arm device 120 is a movable device (e.g., can be moved from one room to another and/or from one bed to another).

Figure 2:
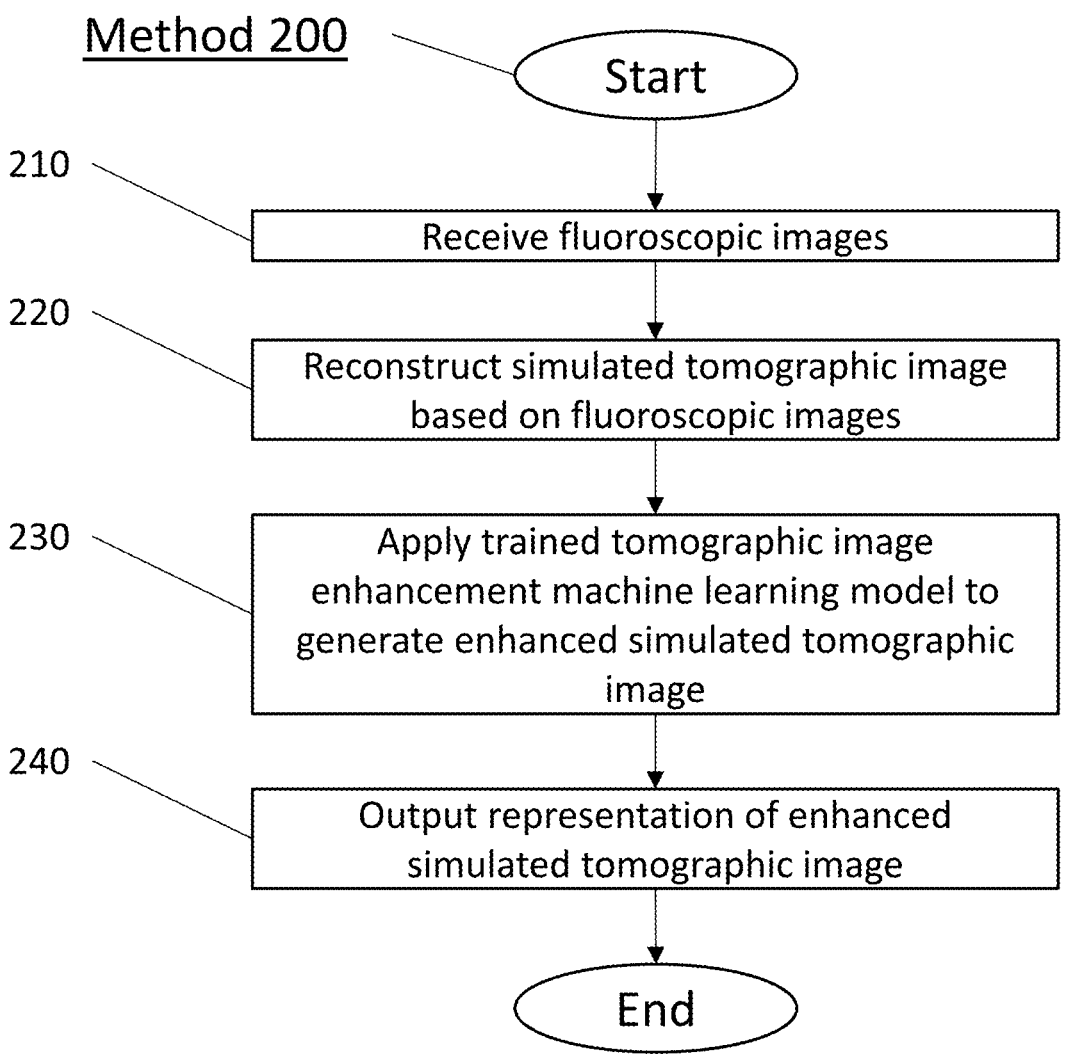
FIG. 2 shows an exemplary process for generating a CT-like image.

FIG. 2 illustrates an example of an implementation of a method 200 in accordance with one or more exemplary embodiments of the present disclosure. In some embodiments, the method shown in FIG. 2 is a method for generating a CT-like image based on medical images obtained using a conventional C-arm. In the following, an exemplary method will be described with reference to the elements of the exemplary medical imaging system 100 described above with reference to FIG. 1. In other embodiments, the exemplary method described below is practiced through the use of other system arrangements. The exemplary method 200 is described with reference to a process for imaging a lung of a patient. In other embodiments, substantially the same method is used to image a lung or a liver of a patient, to perform an image-guided biopsy procedure, to conduct an injection of pain medication, to visualize a tool in proximity to a spine of a patient, to deliver drug therapy or ablation therapy to a target location within a body (e.g., a lesion), or any other purpose for which CT imaging is typically utilized.

In step 210, the computing device 110 receives, from the C-arm device 120, a sequence of fluoroscopic images. In some embodiments, the sequence of fluoroscopic images are images of at least a portion of a lung of a patient. In some embodiments, each fluoroscopic image in the sequence of fluoroscopic images is obtained by the imaging device 124 positioned at a particular pose of a plurality of poses traversed by the C-arm 126 while the C-arm 126 is moved through a range of motion. In some embodiments, the range of motion includes rotational motion (e.g., rotation of the C-arm 126 to thereby rotate the imaging device 124 about the patient P) through a range of rotation. In some embodiments, the range of motion includes both rotational motion through a range of rotation and translational motion (e.g., movement of the C-arm 126 along the axis of rotation to thereby translate the imaging device 124 linearly with respect to the patient P) through a range of translational motion. In some embodiments, a range of motion including both rotational motion and translational motion is advantageous in order to avoid physical obstacles to rotational motion (e.g., either a table or a patient's body obstructing motion of the C-arm 126).

Figure 3A:
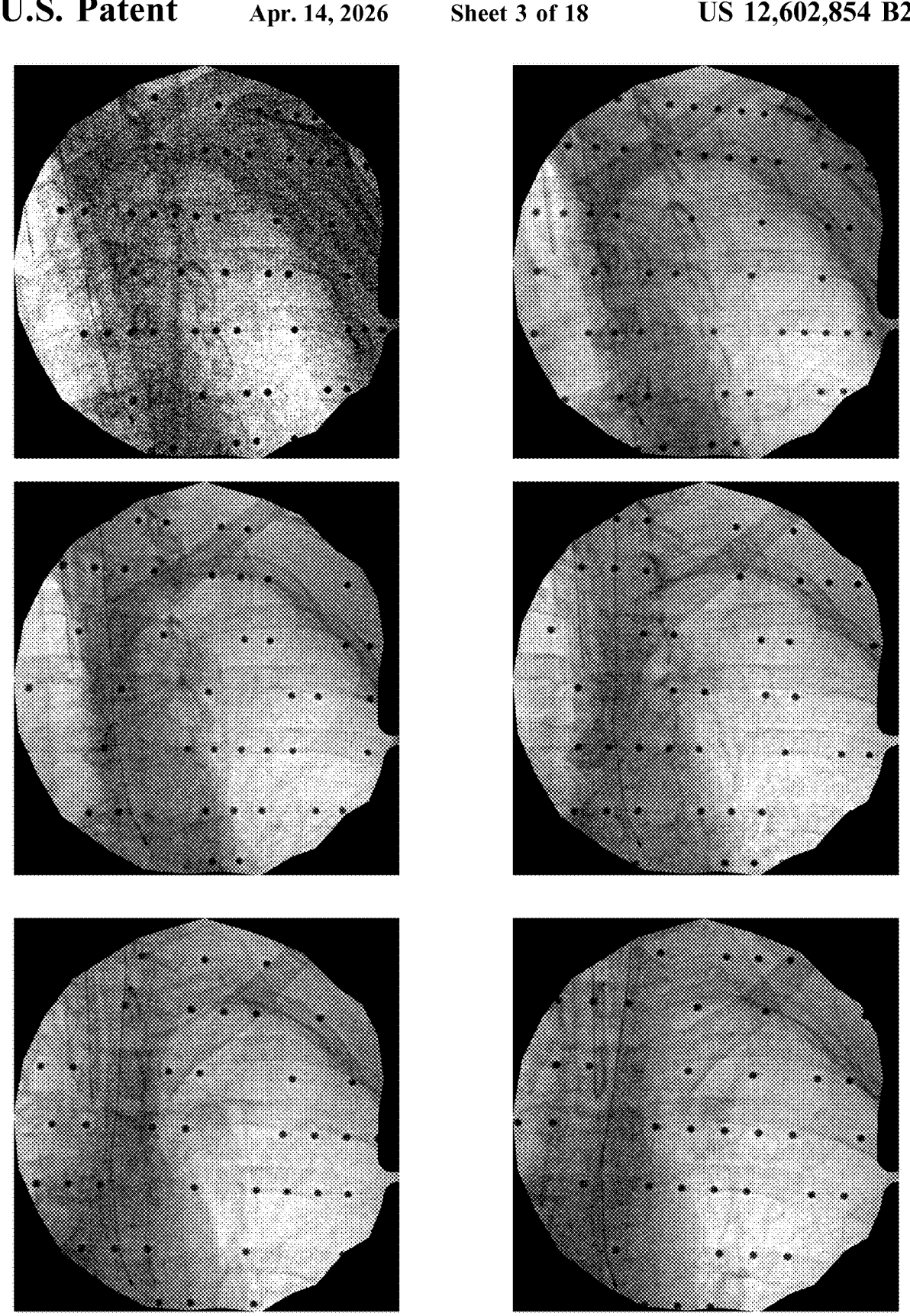
FIG. 3A shows an exemplary sequence of fluoroscopic images.

An exemplary sequence of fluoroscopic images is shown in FIG. 3A. FIG. 3A shows six fluoroscopic images as a representative sampling. In some embodiments, the sequences of fluoroscopic images received in step 210 varies based on factors such as frame rate (e.g., in a range of between 5 images per second and 20 images per second, such as 8 images per second or 15 images per second) and duration of acquisition (e.g., in a range of between 10 seconds and 120 seconds, such as between 30 seconds and 60 seconds). For example, in some embodiments, the sequence of fluoroscopic images received in step 210 includes between 80 and 1800 images.

In some embodiments, the range of rotation is less than 180 degrees. In some embodiments, the range of rotation is in a range of 0 degrees to 180 degrees. In some embodiments, the range of rotation is in a range of 15 degrees to 180 degrees. In some embodiments, the range of rotation is in a range of 30 degrees to 180 degrees. In some embodiments, the range of rotation is in a range of 45 degrees to 180 degrees. In some embodiments, the range of rotation is in a range of 60 degrees to 180 degrees. In some embodiments, the range of rotation is in a range of 75 degrees to 180 degrees. In some embodiments, the range of rotation is in a range of 90 degrees to 180 degrees. In some embodiments, the range of rotation is in a range of 105 degrees to 180 degrees. In some embodiments, the range of rotation is in a range of 120 degrees to 180 degrees. In some embodiments, the range of rotation is in a range of 135 degrees to 180 degrees. In some embodiments, the range of rotation is in a range of 150 degrees to 180 degrees. In some embodiments, the range of rotation is in a range of 165 degrees to 180 degrees.

In some embodiments, the range of rotation is in a range of 0 degrees to 165 degrees. In some embodiments, the range of rotation is in a range of 15 degrees to 165 degrees. In some embodiments, the range of rotation is in a range of 30 degrees to 165 degrees. In some embodiments, the range of rotation is in a range of 45 degrees to 165 degrees. In some embodiments, the range of rotation is in a range of 60 degrees to 165 degrees. In some embodiments, the range of rotation is in a range of 75 degrees to 165 degrees. In some embodiments, the range of rotation is in a range of 90 degrees to 165 degrees. In some embodiments, the range of rotation is in a range of 105 degrees to 165 degrees. In some embodiments, the range of rotation is in a range of 120 degrees to 165 degrees. In some embodiments, the range of rotation is in a range of 135 degrees to 165 degrees. In some embodiments, the range of rotation is in a range of 150 degrees to 165 degrees.

In some embodiments, the range of rotation is in a range of 0 degrees to 150 degrees. In some embodiments, the range of rotation is in a range of 15 degrees to 150 degrees. In some embodiments, the range of rotation is in a range of 30 degrees to 150 degrees. In some embodiments, the range of rotation is in a range of 45 degrees to 150 degrees. In some embodiments, the range of rotation is in a range of 60 degrees to 150 degrees. In some embodiments, the range of rotation is in a range of 75 degrees to 150 degrees. In some embodiments, the range of rotation is in a range of 90 degrees to 150 degrees. In some embodiments, the range of rotation is in a range of 105 degrees to 150 degrees. In some embodiments, the range of rotation is in a range of 120 degrees to 150 degrees. In some embodiments, the range of rotation is in a range of 135 degrees to 150 degrees.

In some embodiments, the range of rotation is in a range of 0 degrees to 135 degrees. In some embodiments, the range of rotation is in a range of 15 degrees to 135 degrees. In some embodiments, the range of rotation is in a range of 30 degrees to 135 degrees. In some embodiments, the range of rotation is in a range of 45 degrees to 135 degrees. In some embodiments, the range of rotation is in a range of 60 degrees to 135 degrees. In some embodiments, the range of rotation is in a range of 75 degrees to 135 degrees. In some embodiments, the range of rotation is in a range of 90 degrees to 135 degrees. In some embodiments, the range of rotation is in a range of 105 degrees to 135 degrees. In some embodiments, the range of rotation is in a range of 120 degrees to 135 degrees. In some embodiments, the range of rotation is in a range of 0 degrees to 120 degrees. In some embodiments, the range of rotation is in a range of 15 degrees to 120 degrees. In some embodiments, the range of rotation is in a range of 30 degrees to 120 degrees. In some embodiments, the range of rotation is in a range of 45 degrees to 120 degrees. In some embodiments, the range of rotation is in a range of 60 degrees to 120 degrees. In some embodiments, the range of rotation is in a range of 75 degrees to 120 degrees. In some embodiments, the range of rotation is in a range of 90 degrees to 120 degrees. In some embodiments, the range of rotation is in a range of 105 degrees to 120 degrees.

In some embodiments, the range of rotation is in a range of 0 degrees to 105 degrees. In some embodiments, the range of rotation is in a range of 15 degrees to 105 degrees. In some embodiments, the range of rotation is in a range of 30 degrees to 105 degrees. In some embodiments, the range of rotation is in a range of 45 degrees to 105 degrees. In some embodiments, the range of rotation is in a range of 60 degrees to 105 degrees. In some embodiments, the range of rotation is in a range of 75 degrees to 105 degrees. In some embodiments, the range of rotation is in a range of 90 degrees to 105 degrees. In some embodiments, the range of rotation is in a range of 0 degrees to 90 degrees. In some embodiments, the range of rotation is in a range of 15 degrees to 90 degrees. In some embodiments, the range of rotation is in a range of 30 degrees to 90 degrees. In some embodiments, the range of rotation is in a range of 45 degrees to 90 degrees. In some embodiments, the range of rotation is in a range of 60 degrees to 90 degrees. In some embodiments, the range of rotation is in a range of 75 degrees to 90 degrees.

In some embodiments, the range of rotation is in a range of 0 degrees to 75 degrees. In some embodiments, the range of rotation is in a range of 15 degrees to 75 degrees. In some embodiments, the range of rotation is in a range of 30 degrees to 75 degrees. In some embodiments, the range of rotation is in a range of 45 degrees to 75 degrees. In some embodiments, the range of rotation is in a range of 60 degrees to 75 degrees. In some embodiments, the range of rotation is in a range of 0 degrees to 60 degrees. In some embodiments, the range of rotation is in a range of 15 degrees to 60 degrees. In some embodiments, the range of rotation is in a range of 30 degrees to 60 degrees. In some embodiments, the range of rotation is in a range of 45 degrees to 60 degrees. In some embodiments, the range of rotation is in a range of 0 degrees to 45 degrees. In some embodiments, the range of rotation is in a range of 15 degrees to 45 degrees. In some embodiments, the range of rotation is in a range of 30 degrees to 45 degrees. In some embodiments, the range of rotation is in a range of 0 degrees to 30 degrees. In some embodiments, the range of rotation is in a range of 15 degrees to 30 degrees. In some embodiments, the range of rotation is in a range of 0 degrees to 15 degrees.

Figure 3B:
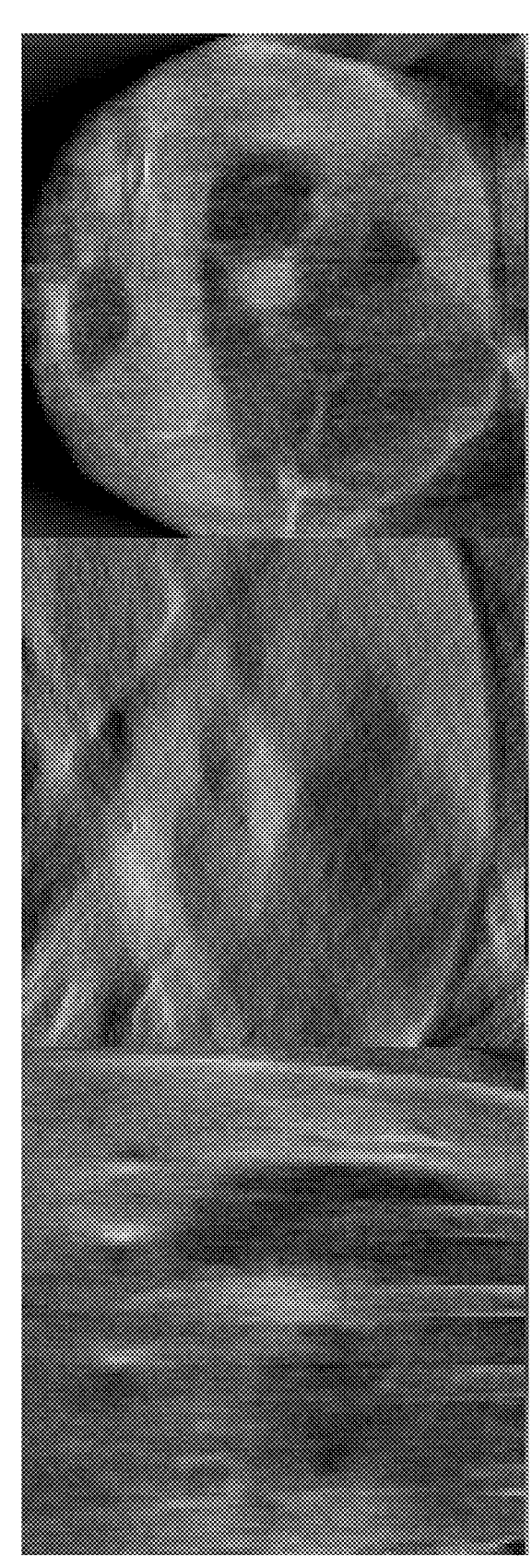
FIG. 3B shows an exemplary tomographic image reconstructed using the fluoroscopic images shown in FIG. 3A.

In step 220, the computing device 110 applies a reconstruction process to the sequence of fluoroscopic images to generate a tomographic image (e.g., a non-enhanced tomographic image) (e.g., a three-dimensional image). In some embodiments, the reconstruction is performed based at least in part on the known pose of each image in the sequence of fluoroscopic images. In some embodiments, the pose of each image is determined using image-based pose estimation (e.g., based on recognition of objects shown in each image, such as anatomical features or radiopaque markers). In some embodiments, image-based pose estimation is performed as described in U.S. Pat. No. 10,674,970, the contents of which are incorporated herein by reference in their entirety. In some embodiments, the reconstruction process includes filtered back projection ("FBP"), algebraic reconstruction technique ("ART"), simultaneous algebraic reconstruction technique ("SART"), or simultaneous iterative reconstruction technique ("SIRT"). Coronal, axial, and sagittal slices of an exemplary tomographic image are shown in FIG. 3B.

Figure 3C:
FIG. 3C shows an exemplary reference CT image for comparison to the tomographic image shown in FIG. 3B.

In some embodiments the tomographic image generated in step 220 is a similar type of image to a "gold standard" reference CT image that would be obtained for the same patient that was represented by the images received in step 210, but is of lesser quality. Coronal, axial, and sagittal slices of an exemplary reference CT image are shown in FIG. 3C. For example, in some embodiments, the tomographic image generated in step 220 is of lower resolution, lower fidelity, or otherwise of lesser quality than would be a reference CT image. In some embodiments, the tomographic image generated in step 220 is not of sufficient quality for a clinician (e.g., a radiologist) to discern a lesion or other object that is less than 30 millimeters in size. In some embodiments, the tomographic image generated in step 220 is not of sufficient quality for a clinician (e.g., a radiologist) to discern a lesion or other object that is less than 10 millimeters in size. In some embodiments, the tomographic image generated in step 220 includes one or more artifacts.

Figure 3D:
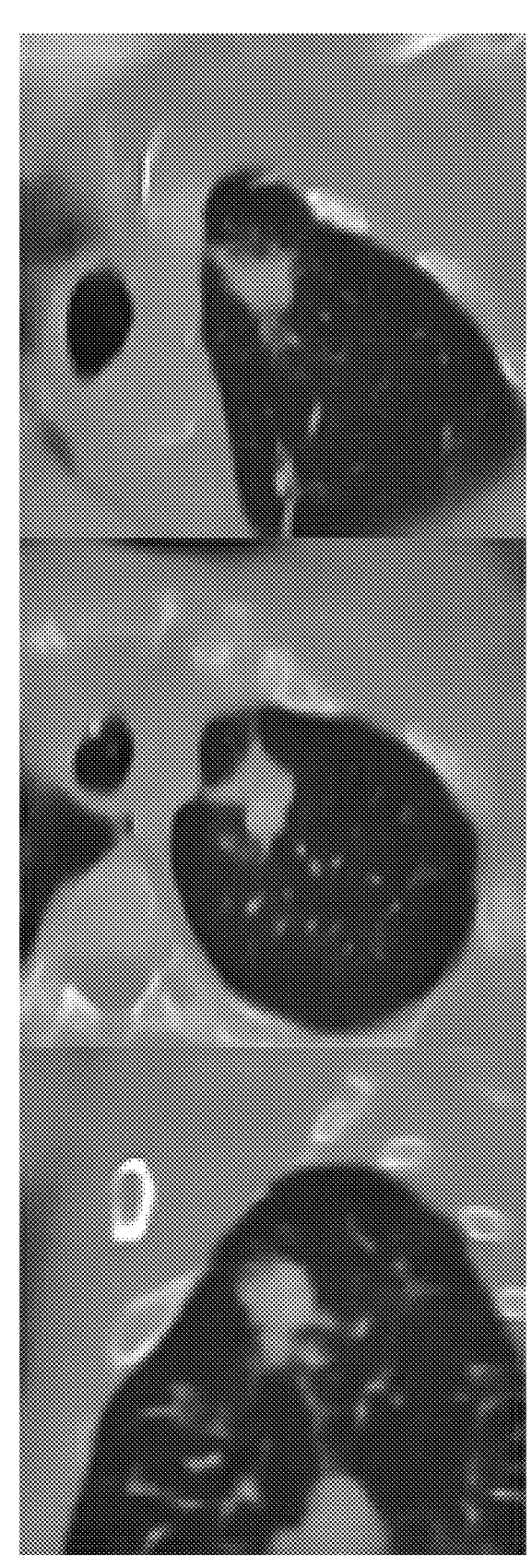
FIG. 3D shows an exemplary enhanced tomographic image (e.g., a CT-like image) generated based on the tomographic image shown in FIG. 3B in accordance with an exemplary embodiment.

In step 230, the computing device 110 applies a trained tomographic image enhancement machine learning model to the tomographic image that was generated in step 220 to thereby generated an enhanced tomographic image. In some embodiments, the trained tomographic image enhancement machine learning model is trained as will be described in further detail hereinafter in relation to the exemplary method 400. In some embodiments the enhanced tomographic image generated in step 230 is a similar type of image to a "gold standard" reference CT image that would be obtained for the same patient that was represented by the images received in step 210, and is of comparable quality. For example, in some embodiments, the enhanced tomographic image generated in step 230 includes fewer artifacts than does the simulated tomographic image generated in step 220. An exemplary enhanced tomographic image is shown in FIG. 3D.

In step 240, the computing device 110 outputs a representation of the enhanced tomographic image. In some embodiments, the representation is a two-dimensional slice of the enhanced tomographic image, such as an axial slice. In some embodiments, output is to a display (e.g., a display that is communicatively coupled to the computing device 110). In some embodiments, output is to a further software program (e.g., a program generating enhanced imagery, a surgical planning program, etc.). As may be seen in FIGS. 3C and 3D, in some embodiments, the enhanced tomographic image generated in step 230 is of sufficient quality for a clinician (e.g., a radiologist) to discern a lesion or other object that is less than 30 millimeters in size. In some embodiments, the enhanced tomographic image generated in step 230 is of sufficient quality for a clinician (e.g., a radiologist) to discern a lesion or other object that is less than 10 millimeters in size.

FIG. 4 illustrates an example of an implementation of a method in accordance with one or more exemplary embodiments of the present disclosure. In some embodiments, the method 400 shown in FIG. 4 is a method for training a trained tomographic image enhancement machine learning model for use in generating a CT-like image based on medical images obtained using a conventional C-arm. In the following, an exemplary method 400 will be described with reference to the elements of the exemplary system 100 described above with reference to FIG. 1, but it will be apparent to those of skill in the art that other suitable arrangements of systems are also possible. For example, in the following description, the method 400 is described with reference to training of a machine learning model at the computing device 110 of the exemplary medical imaging system 100. However, in other embodiments, the exemplary training method 400 shown in FIG. 4 is performed in a separate computing environment and is then provided to the medical imaging system 100 for performance of the exemplary method 200 as described above.

In step 410, the computing device 110 receives CT image data including a CT image for each patient of a plurality of patients. In some embodiments, the CT image data is used as a ground truth tomographic image for each patient. FIG. 5A shows coronal, axial, and sagittal slices of an exemplary CT image of a patient.

Figure 5B:
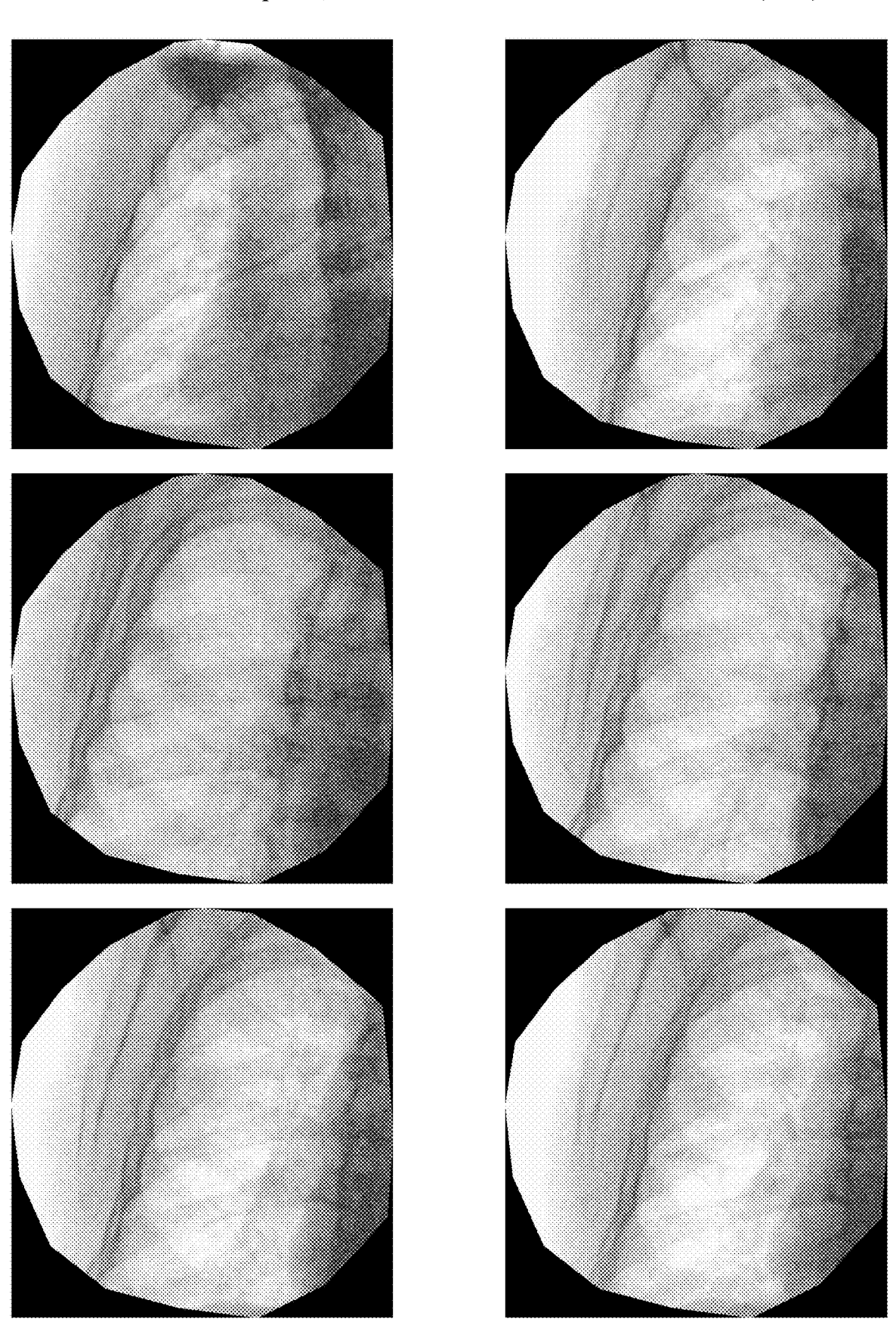
FIG. 5B shows an exemplary sequence of simulated fluoroscopic images generated based on the ground truth tomographic images shown in FIG. 5A.

In step 420, the computing device 110 is provided with a sequence of fluoroscopic images for each patient. In some embodiments, the computing device 110 receives a sequence of actual fluoroscopic images for each patient of the plurality of patients for whom CT image data was received in step 410. In some embodiments, the computing device 110 generates, for the CT image for each patient, a sequence of simulated fluoroscopic images. In some embodiments, each simulated fluoroscopic image is generated by projecting the CT image into the pose of a desired simulated fluoroscopic image. In some embodiments, each simulated fluoroscopic image is generated using a machine learning model, such as a DeepDRR machine learning model. In some embodiments, each simulated fluoroscopic image in a particular sequence of simulated fluoroscopic images for a particular patient corresponds to a particular pose of a C-arm device at a particular angle, such that each simulated fluoroscopic image simulates a fluoroscopic image that would be obtained using a fluoroscopic imaging device mounted on the C-arm device with the C-arm device positioned at the particular angle. In some embodiments, the plurality of simulated fluoroscopic images for each particular patient corresponds to a plurality of angles that spans a range of rotation, such that the sequence of simulated fluoroscopic images for each particular patient simulates a sequence of fluoroscopic images that would be obtained during a C-arm imaging study of the particular patient wherein a C-arm device is moved through the range of rotation. In some embodiments, each particular range of rotation simulated in step 420 is any of the ranges of rotation discussed above with reference to step 210 of the method 200. FIG. 5B shows exemplary simulated fluoroscopic images generated based on the exemplary CT image shown in FIG. 5A. Similar to FIG. 3A discussed above, FIG. 5B shows six exemplary simulated fluoroscopic images; in some embodiments, between 80 and 1800 fluoroscopic images are provided in step 420.

In step 430, the computing device 110 reconstructs, based on each sequence of actual or simulated fluoroscopic images that was provided in step 420, a simulated tomographic image for each of the plurality of patients. In some embodiments, each simulated tomographic image is generated using one of the techniques described above with reference to step 220 of the method 200. Similar to the discussion above with reference to step 220 of the method 200, in some embodiments, the simulated tomographic images generated in step 430 are generally comparable to the ground truth CT images on which they are based, but are of lesser quality. For example, in some embodiments, the simulated tomographic images generated in step 430 are of lower resolution, lower fidelity, or otherwise of lesser quality than are the corresponding ground truth CT images. In some embodiments, the simulated tomographic images generated in step 430 is not of sufficient quality for a clinician (e.g., a radiologist) to discern a lesion or other object that is less than 10 millimeters in size. In some embodiments, the simulated tomographic images generated in step 430 include one or more artifacts. FIG. 5C shows an exemplary simulated tomographic image generated based on the exemplary simulated fluoroscopic images shown in FIG. 5B.

As described herein, the exemplary embodiments relate to training a tomographic image enhancement machine learning model to produce a trained tomographic image enhancement machine learning model. In some embodiments, the tomographic image enhancement machine learning model is a gradient descent machine learning model employing a suitable loss function, e.g., projected gradient descent, fast gradient sign method, stochastic gradient descent, batch gradient descent, mini-batch gradient descent, or other suitable gradient descent technique. In some embodiments, the tomographic image enhancement machine learning model includes a regression model. In some embodiments, the tomographic image enhancement machine learning model includes a neural network. In step 440, the computing device 110 utilizes the tomographic image enhancement machine learning model to perform an enhancement process to enhance the quality of at least some of the simulated tomographic images that was generated in step 430, thereby to obtain a corresponding enhanced simulated tomographic image for each of the plurality of patients. In some embodiments, the enhancement process is performed on a randomly selected subset of the simulated tomographic images. In some embodiments, each of the enhanced simulated tomographic images generated in step 440 may include one or more artifacts. In some embodiments, artifacts may arise from, for example, factors such as reconstruction having been performed using simulated fluoroscopic images missing some data.

In step 450, a score is assigned to each of the enhanced simulated tomographic images that was generated in step 440. In some embodiments, the score is assigned based on each enhanced simulated tomographic image and the corresponding ground truth tomographic image. In some embodiments, the score is assigned based on a comparison of each enhanced simulated tomographic image to the corresponding ground truth tomographic image. In some embodiments, the score is assigned based on the one or more artifacts in each enhanced simulated tomographic image and the corresponding ground truth tomographic image. In some embodiments, the score is assigned based on an automated (e.g., algorithmic) comparison performed by the computing device 110. In some embodiments, the score is assigned by a user. In some embodiments, based on the score of each of the enhanced simulated tomographic images, a performance score for the tomographic image enhancement machine learning model is calculated.

In step 460, the computing device 110 determines whether the performance score of the tomographic image enhancement machine learning model exceeds a predetermined performance score threshold.

If the performance score of the tomographic image enhancement machine learning model does not exceed the predetermined performance score threshold, then the method 400 continues to step 480. In step 480, the parameters (e.g., weights) of the tomographic image enhancement machine learning model are updated, e.g., using back propagation, based on the performance of the gradient descent or other tomographic image enhancement machine learning model. Following step 480, the method 400 returns to step 440, and the enhancement process of step 440 is repeated.

If the performance score of the tomographic image enhancement machine learning model exceeds the predetermined performance score threshold, then the method 400 is complete, and in step 470 the output of the method is a trained tomographic image enhancement machine learning model. In other words, in some embodiments, the enhancement process is iteratively repeated (e.g., by repetition of steps 440, 450, 460, and 480) until the performance score of the tomographic image enhancement machine learning model exceeds the predetermined performance score threshold to thereby produce a trained tomographic image enhancement machine learning model. FIG. 5D shows an exemplary enhanced simulated tomographic image generated based on the exemplary simulated tomographic image shown in FIG. 5C following completion of the training process described above.

In some embodiments, the exemplary tomographic image enhancement machine learning model may be trained until a loss function reaches the acceptable value/threshold (e.g., 0.99 (1%), 0.98 (2%), 0.97 (3%), 0.96 (4%), 0.95 (5%), . . . , 0.90 (10%), . . . 0.85 (15%), etc.). In some embodiments, the loss function may measure an error between an enhanced simulated tomographic image and a corresponding ground truth tomographic image. In some embodiments, the error may be calculated as L2- and/or L1-norm distances.

In some embodiments, a CT-like image generated in accordance with the exemplary techniques described above is comparable to a "gold standard" CT image obtained using a CT scanning device. In some embodiments, a CT-like image generated in accordance with the exemplary techniques described above is of similar quality to a "gold standard" CT image obtained using a CT scanning device, and is generated through the use of source data originating from a standard C-arm-mounted fluoroscopic imaging device. As such, CT-like images can be generated without requiring access to CT scanning devices, which are expensive and are typically in high demand in places where they are available. In some embodiments, a CT-like image generated as described above is usable to identify a lesion or other object that is, for example, less than 10 millimeters in size, thereby enabling early diagnosis of conditions such as lung cancer.

In some embodiments, the identifiability of an object shown in an exemplary CT-like image is defined based on contrast-to-noise ratio ("CNR"). As used herein, contrast refers to the difference in luminance between an object and its surroundings (as represented in an image or display) that makes the object distinguishable. As used herein, CNR can be calculated in accordance with the expression:

$$CNR=(mean(ObjectMask)-mean(BackgroundMask-Portion))/STD(BackgroundMaskPortion)$$

In this expression, mean(ObjectMask) refers to the mean value of luminance within a region that is defined as a lesion, mean(BackgroundMaskPortion) refers to the mean value of luminance within a region defined as a background, and STD(BackgroundMaskPortion) refers to the standard deviation of luminance value within the region defined as the background. Regions used herein are identified as described below.

Figure 6A:
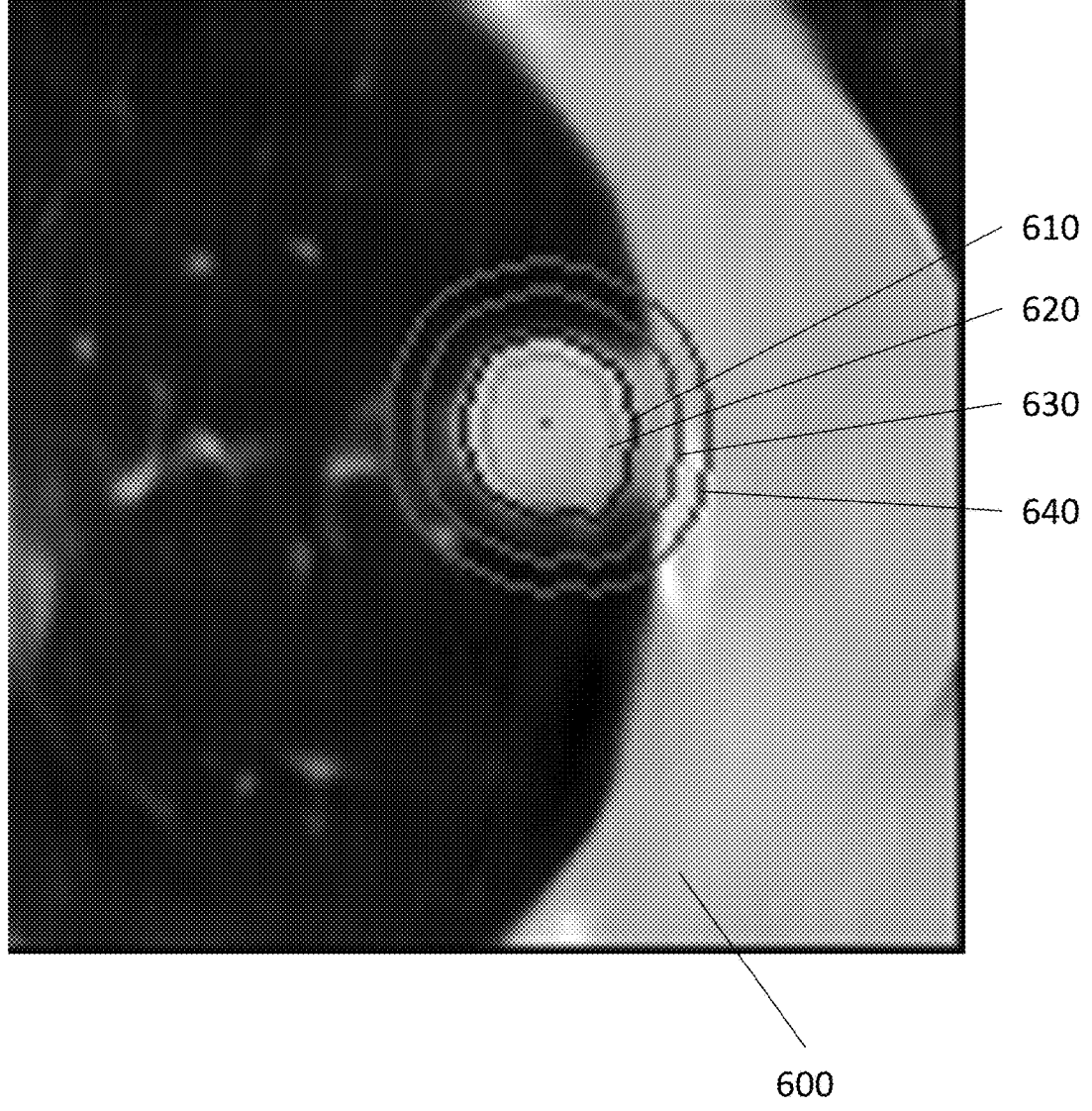
FIG. 6A shows an exemplary enhanced simulated tomographic image as labeled for evaluation using a test method.

The lesion region is identified by labeling a lesion within an exemplary CT-like image in a manner that would be considered suitable by a person having ordinary skill in the art, and can be referred to as an InputObjectMask. FIG. 6A shows an exemplary image 600 with an InputObjectMask, as obtained using user input as described above, delineated by a ring 610. As used herein, a lesion region, which can also be referred to as an ObjectMask, is defined on the basis of an InputObjectMask by the expression:

$$ObjectMask=erosion(InputObjectMask,2)$$

In this expression, erosion(mask, N) means eroding the mask by N pixels. In other words, the ObjectMask is generated by eroding (e.g., decreasing the size of) the InputObjectMask by two (2) pixels. Referring back to FIG. 6A, an ObjectMask is delineated by a ring 620 that is smaller than the ring 610. For the values described above, the background region is defined by dilating (e.g., increasing the size of) the object mask by the expression:

$$BackgroundMask=dilation(ObjectMask,10)-dilation(ObjectMask,5)$$

In this expression, dilation(mask,N) means dilating (e.g., increasing the size of) the mask by N pixels. Referring back to FIG. 6A, a BackgroundMask is delineated by the region between an inner ring 630 and an outer ring 640 that are larger than the ring 610.

Figure 6B:
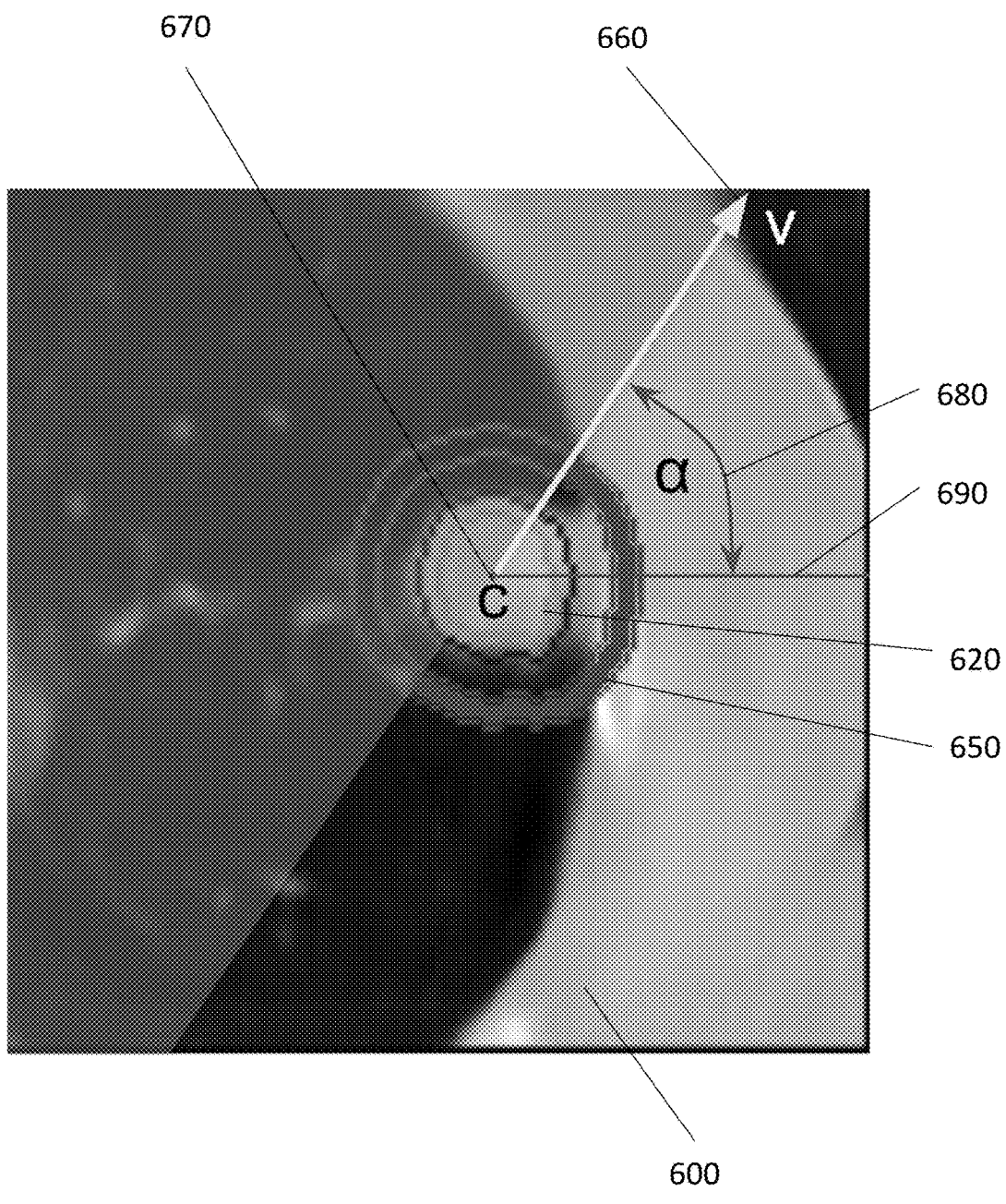
FIG. 6B shows the exemplary enhanced simulated tomographic image of FIG. 6A at a further stage of the test method.
Figure 6C:
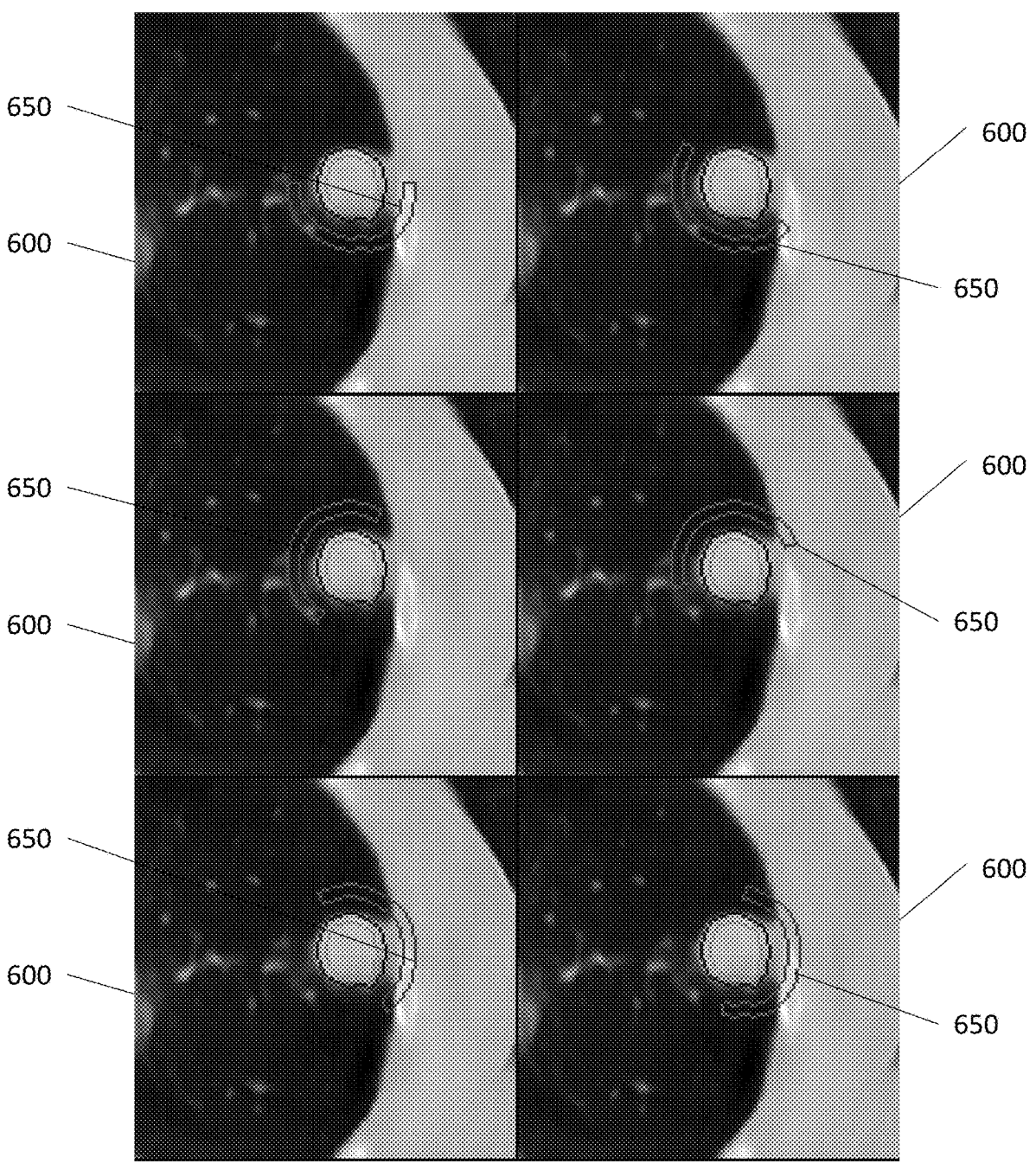
FIG. 6C shows the exemplary simulated tomographic image of FIG. 6A as labeled with various background arcs at a later stage of the test method.

As used herein, BackgroundMaskPortion refers to a 180-degree arc of the background region BackgroundMask that is selected to maximize the calculated value CNR. FIG. 6B shows the creation of one possible 180-degree arc based on the image 600 shown in FIG. 6A. In FIG. 6B, an arc 650 is defined by a vector V 660 extending from the center of mass C 670 of the ObjectMask as delineated by the 620, the vector V 660 extending in a direction defined by an angle α 680 measured from a reference direction 690. As used herein, the reference direction 690 is horizontal as viewed in the image 600, but this is only an arbitrary point of reference and a series of potential 180-degree arcs can be defined based on any given reference point. In accordance with the test method described herein, all possible 180-degree arcs are evaluated computationally. FIG. 6C shows an exemplary sequence of images, each of which shows a different 180-degree arc 650 corresponding to the image 600. Six (6) such images shown are in FIG. 6C as a representative sampling, but the actual quantity of possible arcs that will be evaluated will be greater (e.g., with the number of such arcs depending on the resolution of the image being evaluated).

As discussed above, a contrast-to-noise ratio CNR is calculated based on the lesion ObjectMask (e.g., the ObjectMask delineated by the ring 620 shown in FIG. 6B) and the selected arc (e.g., the BackgroundMaskPortion delineated by the arc 650 shown in FIG. 6B) using the expression:

$$CNR=(mean(ObjectMask)-mean(BackgroundMask-Portion))/STD(BackgroundMaskPortion)$$

In this expression, mean(ObjectMask) refers to the mean value of luminance within a region that is defined as a lesion, mean(BackgroundMaskPortion) refers to the mean value of luminance within the selected arc, and STD(BackgroundMaskPortion) refers to the standard deviation of luminance value within the selected arc. As used herein, an object is identifiable in an image if its CNR (as determined based on the arc that yields the maximum CNR) exceeds 5.

Figure 7A:
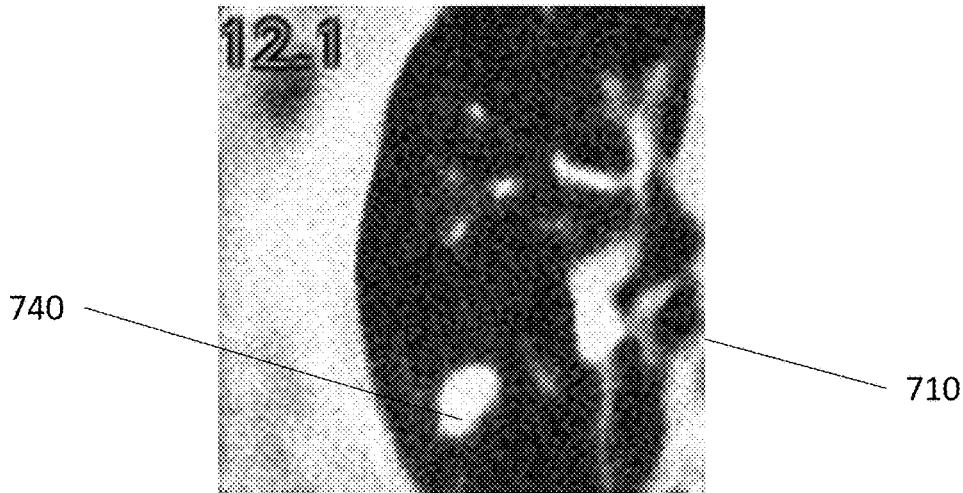
FIG. 7A shows a representative image having a sufficient contrast-to-noise ratio to discern a lesion.
Figure 7B:
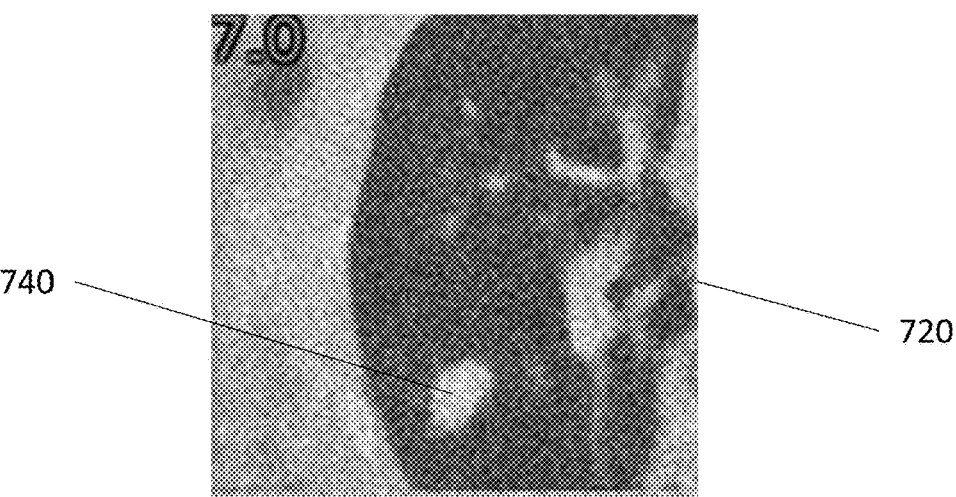
FIG. 7B shows a representative image having a sufficient contrast-to-noise ratio to discern a lesion.
Figure 7C:
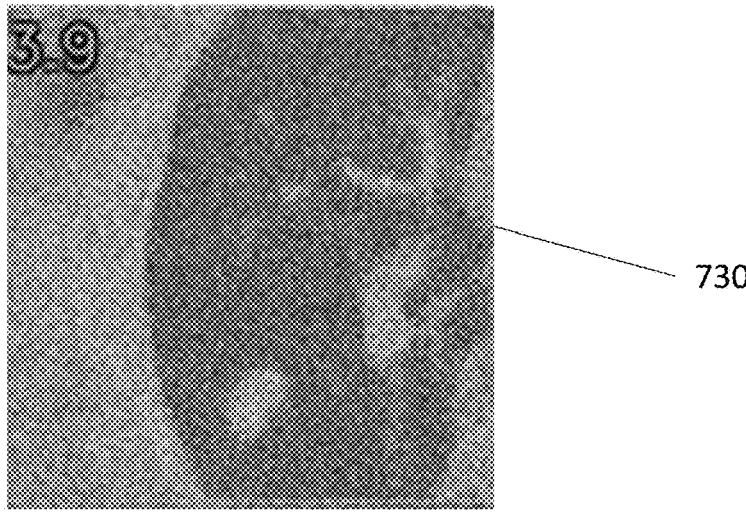
FIG. 7C shows a representative image having an insufficient contrast-to-noise ratio to discern a lesion.
Figure 8A:
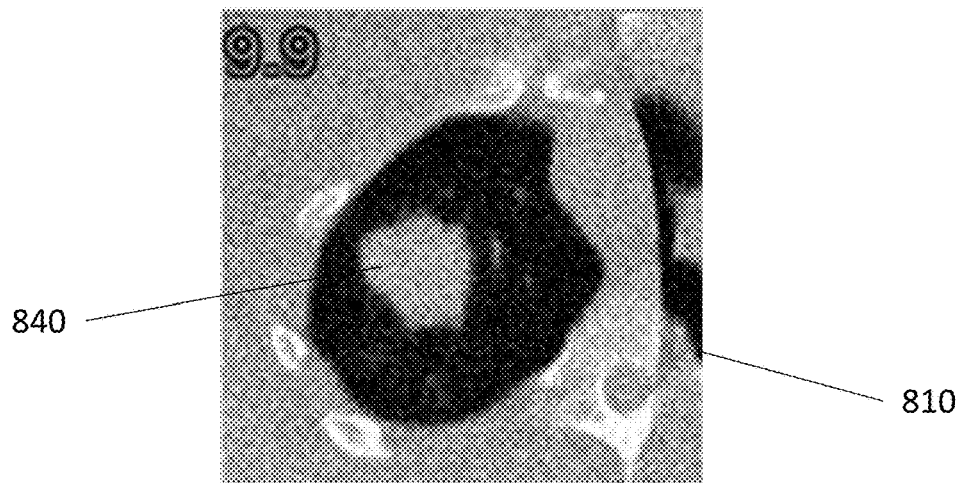
FIG. 8A shows a representative image having a sufficient contrast-to-noise ratio to discern a lesion.
Figure 8B:
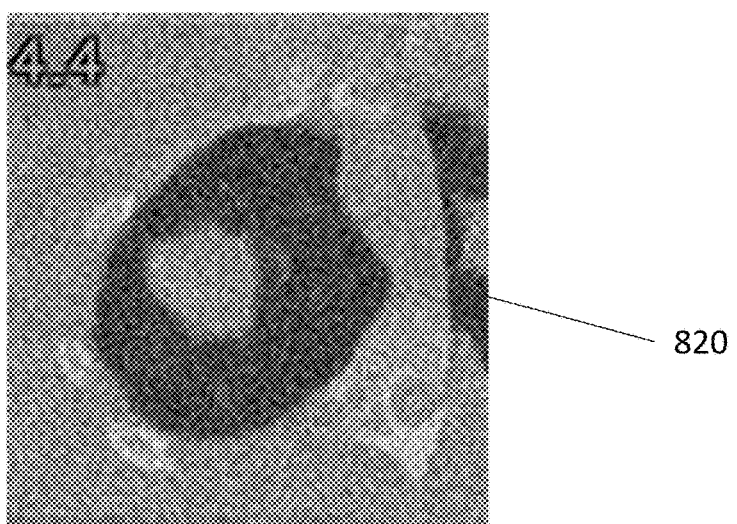
FIG. 8B shows a representative image having an insufficient contrast-to-noise ratio to discern a lesion.
Figure 8C:
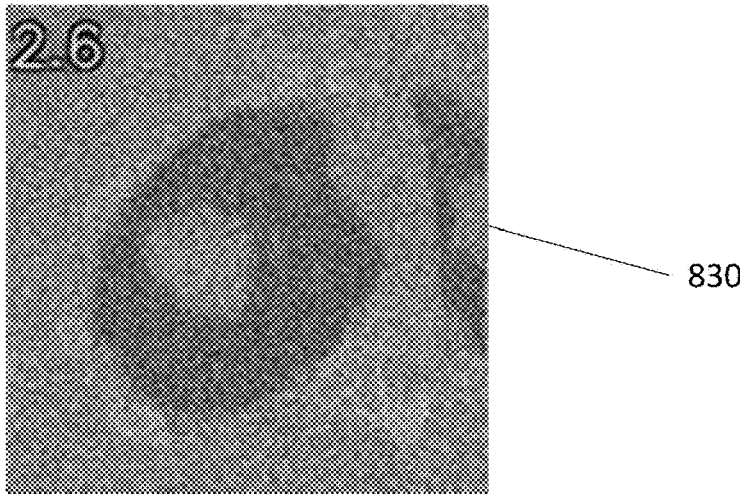
FIG. 8C shows a representative image having an insufficient contrast-to-noise ratio to discern a lesion.
Figure 9A:
FIG. 9A shows a representative image having a sufficient contrast-to-noise ratio to discern a lesion.
Figure 9B:
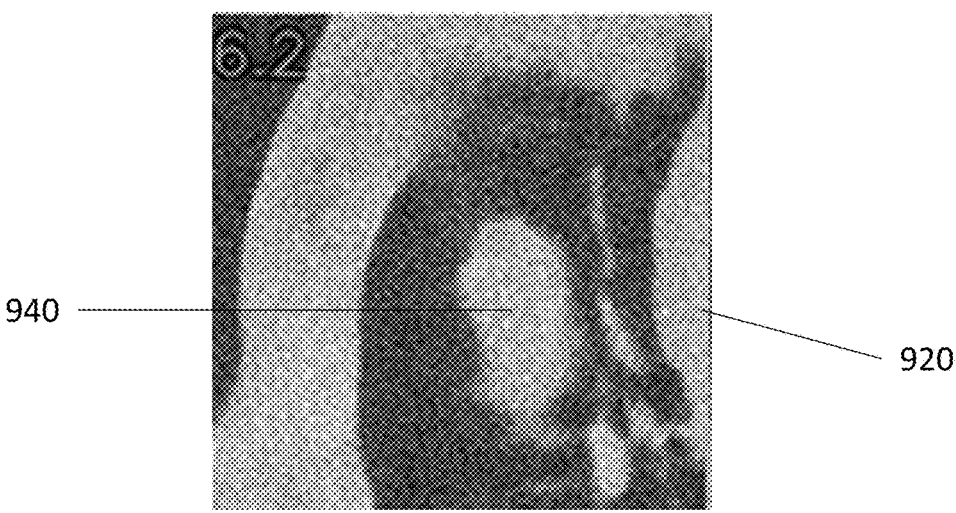
FIG. 9B shows a representative image having a sufficient contrast-to-noise ratio to discern a lesion.
Figure 9C:
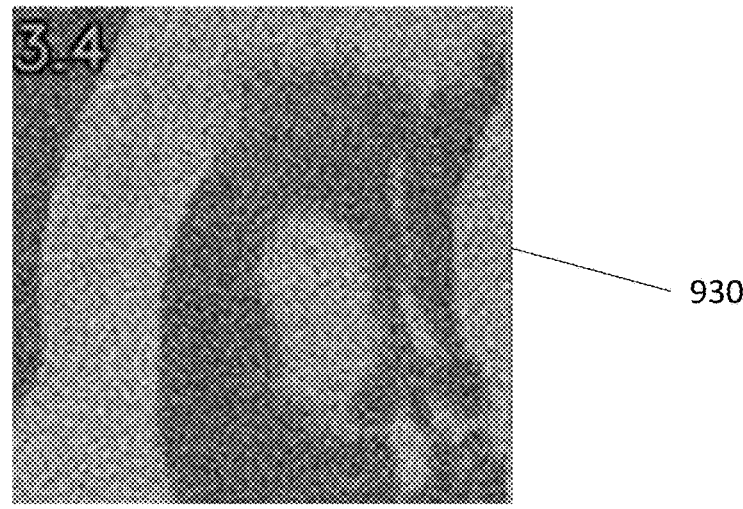
FIG. 9C shows a representative image having an insufficient contrast-to-noise ratio to discern a lesion.
Figures 10A, 10B, 10C:
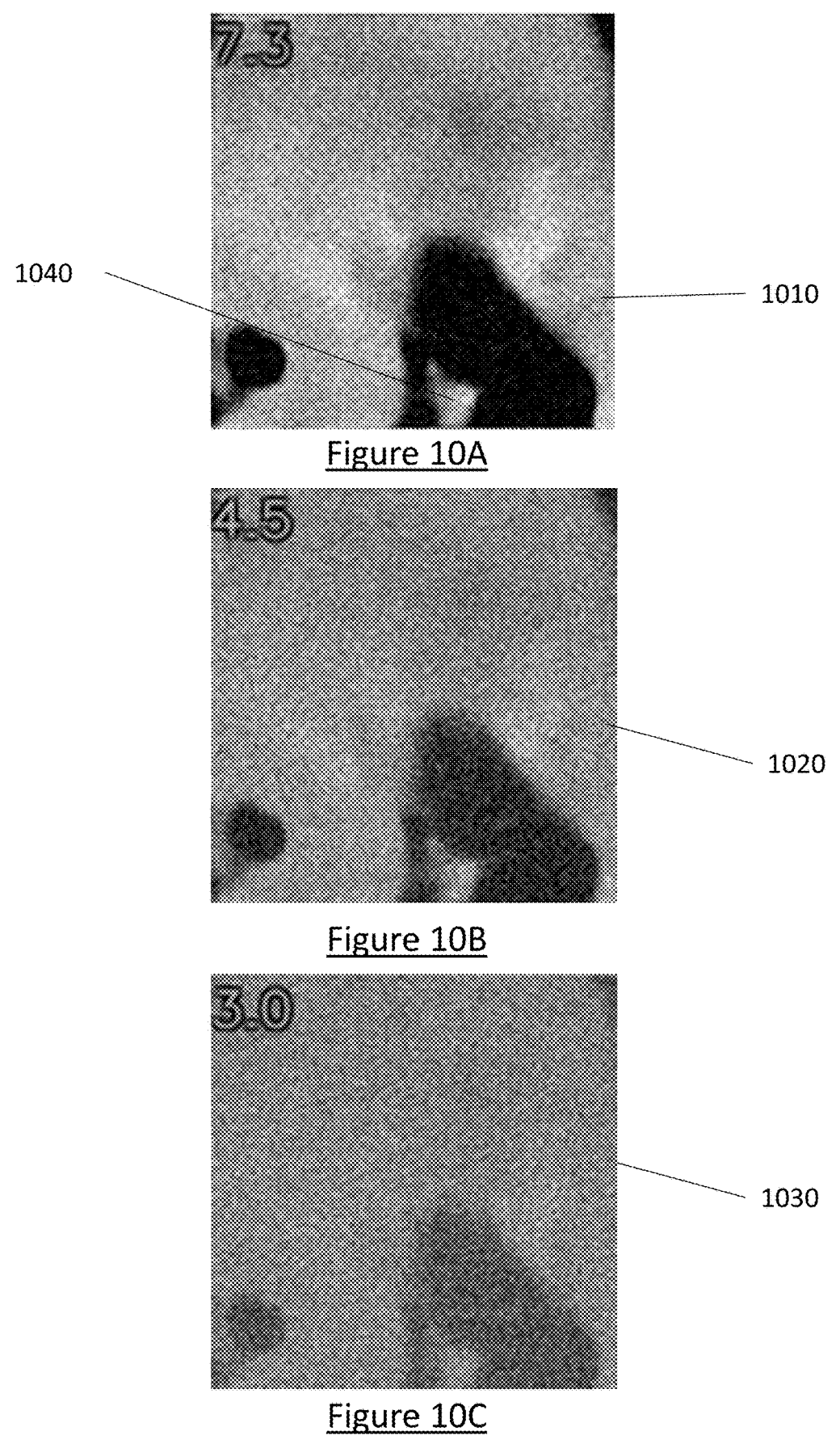

FIGS. 7A-10C show representative images illustrating the applicability of the threshold CNR value of 5 to evaluate the identifiability of a lesion in an image. FIGS. 7A, 7B, and 7C show images 710, 720, 730 having CNR values of 12.7, 7.0, and 3.9, respectively. It may be seen that the images 710 and 720 are of sufficient quality so as to cause a lesion 740 to be discernible, while the image 730 is not. FIGS. 8A, 8B, and 8C show images 810, 820, 830 having CNR values of 9.9, 4.4, and 2.6, respectively. It may be seen that the image 810 is of sufficient quality so as to cause a lesion 840 to be discernible, while the images 820 and 830 are not. FIGS. 9A, 9B, and 9C show images 910, 920, 930 having CNR values of 11.7, 6.2, and 3.4, respectively. It may be seen that the images 910 and 920 are of sufficient quality so as to cause a lesion 940 to be discernible, while the image 930 is not. FIGS. 10A, 10B, and 10C show images 1010, 1020, 1030 having CNR values of 7.3, 4.5, and 3.0, respectively. It may be seen that the image 1010 is of sufficient quality so as to cause a lesion 1040 to be discernible, while the images 1020 and 1030 are not.

In some embodiments, the exemplary techniques described above are applied to generate a CT-like image of at least one organ of a patient (e.g., a lung, a kidney, a liver, etc.). In some embodiments, the exemplary techniques described above are applied to generate a CT-like image showing at least one lesion in at least one organ of a patient (e.g., a lung, a kidney, a liver, etc.). In some embodiments, the exemplary techniques described above are applied to generate a CT-like image showing at least one lesion in at least one organ of a patient (e.g., a lung, a kidney, a liver, etc.) so as to enable diagnosis and/or treatment of the at least one lesion. In some embodiments, the exemplary techniques described above are applied to generate a CT-like image showing at least a portion of a spine of a patient. In some embodiments, the exemplary techniques described above are applied to generate a CT-like image that is utilized to perform an image-guided biopsy procedure. In some embodiments, the exemplary techniques described above are applied to generate a CT-like image that is utilized to perform conduct a pain medicine injection. In some embodiments, the exemplary techniques described above are applied to generate a CT-like image that is utilized to deliver therapy (e.g., drug therapy or ablation therapy) to a lesion shown in the CT-like image.

In some embodiments, the exemplary techniques are capable of producing a CT-like image in which a lesion having a size of less than 30 millimeters is distinguishable from its surroundings based on a test as set forth above. In some embodiments, the exemplary techniques are capable of producing a CT-like image in which a lesion having a size of less than 10 millimeters is distinguishable from its surroundings based on a test as set forth above. In some embodiments, the exemplary techniques are capable of producing a CT-like image in which a lesion having a density of less than −300 Hounsfield units (HU) is distinguishable from its surroundings based on a test as set forth above. In some embodiments, the exemplary techniques are capable of producing a CT-like image without requiring the participating of a licensed radiologist who would be required to operate a CT scanner. In some embodiments, the exemplary techniques are capable of producing a CT-like image without requiring a patient to be exposed to the high radiation dose that would be delivered by a CT scanner.

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A method, comprising:
   a) receiving, by a controller unit, from a C-arm device, a plurality of fluoroscopic images of at least one portion of a lung of a patient,
      wherein each image of the plurality of fluoroscopic images is obtained with the C-arm device positioned at a particular pose of a plurality of poses traversed by the C-arm device while the C-arm device is moved through a range of motion,
      wherein the range of motion comprises at least a range of rotation, and
      wherein the range of rotation encompasses a sweep angle that is between 45 degrees and 75 degrees;
   b) generating, by the controller unit, an enhanced tomographic image of the at least a portion of the lung, by utilizing at least:
      a trained machine learning model and
      the plurality of fluoroscopic images; and
   c) outputting, by the controller unit, a representation of the enhanced tomographic image,
      wherein, when tested by a test method in which:
         (a) the at least one portion of the lung of the patient includes at least one lesion having a size of less than 30 millimeters, and
         (b) the representation of the enhanced tomographic image is an axial slice showing a defined boundary of the at least one lesion,
         the at least one lesion has a contrast-to-noise value of at least 5 as compared to a background of the representation.

2. The method of claim 1, wherein the step of generating the enhanced tomographic image comprises:
   reconstructing a tomographic image based on the plurality of fluoroscopic images; and
   enhancing the tomographic image using the trained machine learning model to generate the enhanced tomographic image.

3. The method of claim 2, wherein the step of reconstructing the tomographic image based on the plurality of fluoroscopic images comprises reconstructing the tomographic image using filtered back projection.

4. The method of claim 2, wherein the step of reconstructing the tomographic image based on the plurality of fluoroscopic images comprises determining a pose of each of the plurality of fluoroscopic images.

5. The method of claim 4, wherein the determining the pose of each of the plurality of fluoroscopic images comprises image-based pose estimation.

6. The method of claim 5, wherein the image-based pose estimation comprises recognition of at least one of an anatomical feature or a radiopaque marker.

7. The method of claim 1, wherein the sweep angle is between 60 degrees and 75 degrees.

8. The method of claim 1, wherein, when tested by a test method in which:
   (a) the at least one portion of the lung of the patient includes at least one lesion having a size of less than 10 millimeters, and
   (b) the representation of the enhanced tomographic image is an axial slice showing a defined boundary of the at least one lesion,
   the at least one lesion has a contrast-to-noise value of at least 5 as compared to a background of the representation.

9. The method of claim 1, wherein the trained machine learning model comprises a gradient descent machine learning model.

10. The method of claim 1, wherein the range of motion further comprises a range of translational motion.

11. The method of claim 1, wherein the sweep angle is between 45 degrees and 60 degrees.

* * * * *